United States Patent [19]

Anafi et al.

[11] Patent Number: 4,953,964
[45] Date of Patent: Sep. 4, 1990

[54] PHASED ARRAY TELESCOPE

[75] Inventors: David Anafi, West Palm Beach; Philip A. Slaymaker, Palm Beach Gardens, both of Fla.

[73] Assignee: United Technologies Corporation, Hartford, Conn.

[21] Appl. No.: 263,435

[22] Filed: Oct. 24, 1988

[51] Int. Cl.⁵ .................. G02B 23/02; G02B 26/06
[52] U.S. Cl. ........................... 350/557; 250/201; 356/141
[58] Field of Search ............... 350/557, 558; 250/201; 356/345, 354, 363, 141

[56] References Cited

U.S. PATENT DOCUMENTS

| | | | |
|---|---|---|---|
| 3,992,629 | 11/1976 | Chapman | 350/557 |
| 4,413,909 | 11/1983 | Pohle | 356/354 |
| 4,667,090 | 5/1987 | Carreras et al. | 250/201 |
| 4,740,677 | 4/1988 | Carreras et al. | 250/201 |
| 4,831,246 | 5/1989 | Wallentine et al. | 250/201 |

OTHER PUBLICATIONS

W. J. Smith, *Modern Optical Engineering*, McGraw-Hill, New York, 1966, pp. 42–43.

*Primary Examiner*—Bruce Y. Arnold
*Assistant Examiner*—Martin Lerner

[57] ABSTRACT

A phased array telescope system is permitted to have a larger field of view by simultaneous compensation of piston error and exit pupil location to properly combine the sub-images from the telescopes with the correct lateral displacement and correct magnification to preserve Lagrange invariance between the separate telescopes in the system.

5 Claims, 4 Drawing Sheets

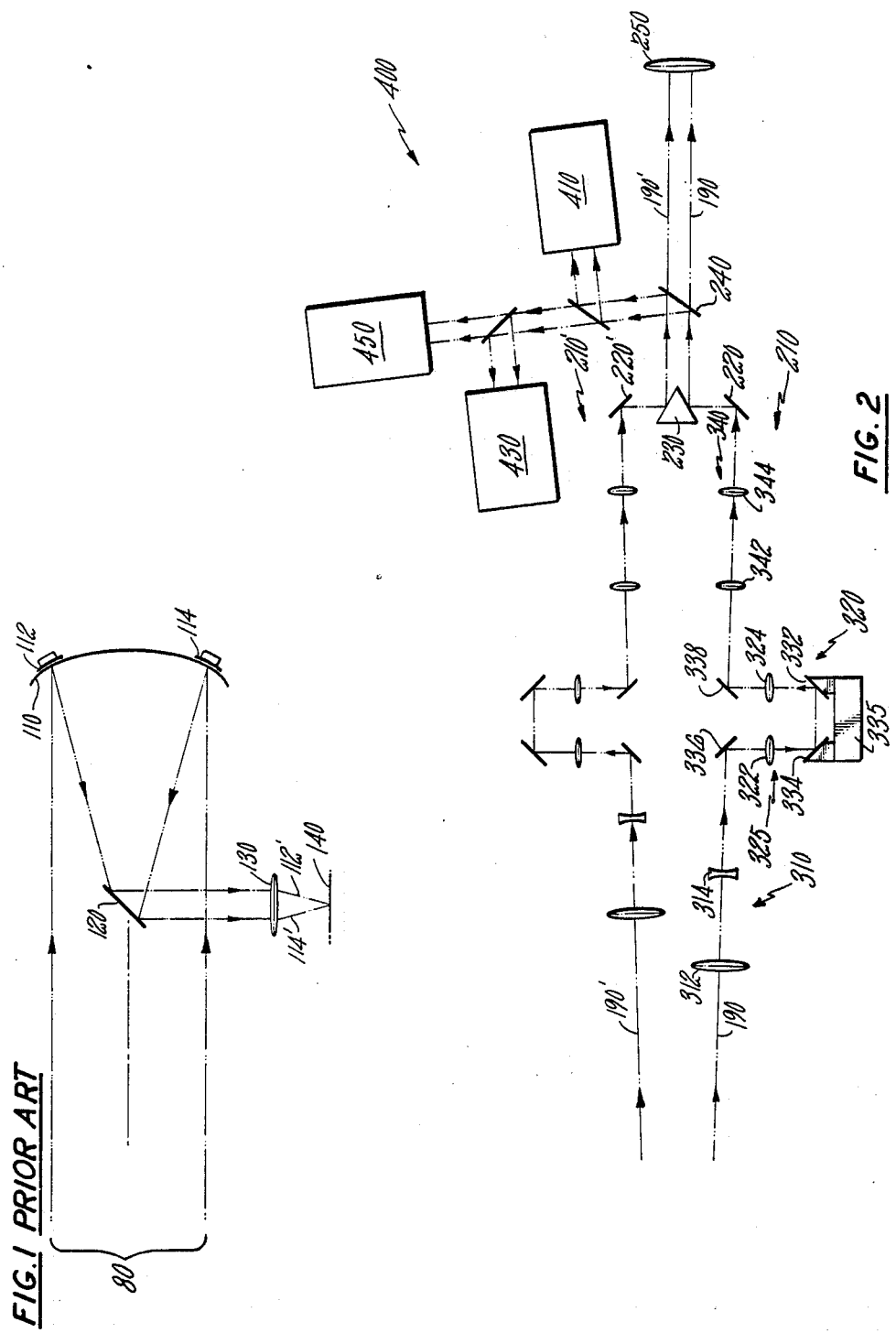

PHASED ARRAY TELESCOPE

TECHNICAL FIELD

The field of the invention is that of optics, in particular, the combination of images from an array of small telescopes to form the equivalent of a single large telescope.

BACKGROUND ART

It has long been known in the field of optical detectors that it is possible to simulate the effect of a single large telescope by properly combining the outputs from a number of small telescopes. FIG. 1 illustrates schematically a large reflecting telescope in which a beam of incident radiation labeled 80 strikes a primary mirror 110 and is focused down and deflected from a turning mirror 120 onto a final lens 130. The image is formed on detector 140 which is illustratively an array of photodiode detectors.

If, for example, mirror 110 were replaced by two smaller mirrors denoted 112 and 114 having the same curvature as the corresponding portions of mirror 110, these two small mirrors would reflect radiation along the dotted lines through lens 130 and down to detector plane 140. The radiation traveling along paths 112' and 114' will, of course, not be along a single line but will occupy a finite extent in space. In particular, the radiation from the two mirrors 112 and 114 will overlap when it strikes detector 140. It is therefore essential, as is known in the art, that the combination of two smaller mirrors be done in such a manner that the image is not blurred or otherwise distorted. It has been known, for example, that the "piston" effect, in which the optical path difference between mirrors 112 and 114 is not properly compensated for, may spoil the resolution. It is also known that the individual optical systems of the subapertures must transform the incoming radiation in the same manner, so that rays coming into the total aperture having the same slope and height with respect to the overall optic axis must exit the optical system, i.e., exit lens 130, also having the same slope and height.

DISCLOSURE OF INVENTION

The invention relates to an improved phased array optical telescope having several optical trains, in which the spacing between individual optical trains, the optical path difference between the trains and the relative locations of the image planes of the optical trains are adjusted in order to improve the field of view of the phased array beyond what has been possible in the prior art.

The problem addressed by this invention is that of increasing the field of view of the composite telescope by correcting both the exit pupil location of the individual images, the piston error between optical trains, and the image positions of each sub-telescope by a control system that simultaneously adjusts all of these quantities. Control of one quantity alone is not sufficient when the individual telescopes in the array have a path difference to the object. Such a path difference is inherent when the individual telescopes are steered to point at an object off the nominal axis of the system.

BRIEF DESCRIPTION OF THE DRAWINGS

FIG. 1 illustrates a prior art telescope.

FIG. 2 illustrates in partially schematic, partially pictorial form a two-telescope of the embodiment of the invention.

BEST MODE FOR CARRYING OUT THE INVENTION

Figure 3:
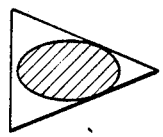
FIG. 3 illustrates a device for combining the output beams from the individual telescopes in an adjustable manner.

FIG. 2 illustrates a two-telescope embodiment of the invention in which a first telescope, denoted generally by the numeral 210, and a second telescope denoted by the numeral 210', point along axis 190 and 190' respectively, to produce two output beams that are combined by beam spacer control mirror 230 to form a final output beam that passes through lens 250 to a detector in the image plane. For purposes of this disclosure, the radiation passing through each telescope will be referred to as a sub-beam; the image formed from a sub-beam will be referred to as a sub-image and the apparatus that does it is an optical relay. The process of passing radiation from one image plane to another will be referred to as relaying the image or sub-image and the apparatus that does it is an optical relay. Convenient sources of information on optical relays are: W.J. Smith, *Modern Optical Engineering*, McGraw-Hill, New York, 1966; and *Military Standardization Handbook- Optical Design*, Defense Supply Agency, 1962). The relays need not work with collimated beams, though that is more convenient.

A control system, denoted generally by the numeral 400, receives a sample beam tapped off by beam splitter 240 from the final combined beam. This general control system consists of three subunits, 410 which controls the spacing between the output beams 190 and 190', a tilt control unit 430 which controls two tilt mirrors 220 and 220' that control the relative angle of the two output beams, and a piston control/image sharpening control system 450, which controls an optical unit that simultaneously compensates for piston errors between the two telescopes and also for the image quality. Examples of these systems may be found in: Jordan, D.H., Morrow, D.R., Goranson, R.W. "Control Loop Sensor for an Optical Synthetic Aperture", Proceedings of Thespie-440, *Synthetic Aperture Systems*, Ed J.S. Fender, 1983; and R. W. Scott, C.A. Lors, "Synthetic Aperture Control Systems", American Controls Conference 1986, Seattle, WA.

Within telescope 210, there is a first unit, referred to by the numeral 310, as a primary telescope consisting of a converging lens 312 followed by a diverging lens 314. This is the basic telescope unit and may, of course, be composed of mirrors instead of lenses. Following the primary telescope, there is an optical relay system, denoted generally by the numeral 320 and consisting of a pair of tilt deflection mirrors 336 and 338 which deflect the beam transversely to the optical axis of the telescope and then return it and a pair of corner mirrors 332 and 334 which perform the inverse function of redirecting the beam back towards the optic axis. These two mirrors 332 and 334 are mounted together on a single mounting system indicated schematically by a box labelled with the numeral 335 that is translated towards and away from the axis of beam 190 in order to control the optical path difference between individual telescopes 210 and 210'. Within this deflection region 320, there are two lenses 322 and 324 that form a relay 325. These two lenses combine to have a non-unity magnification and interact with the next unit in the beam train, which is a second beam relay 40 composed of lenses 342 and 344. Relay 340 may have the inverse magnification of relay 325 so that the net magnification of the beam is unaffected. By changing the spacing along the beam path between lenses 322 and 324, however, the magnification of the beam traveling along axis 190 is changed, with the effect that the image plane is moved along that axis. The combination of mirrors 332, 334, 336 and 338 form a conventional system referred to as an optical trombone and lenses 342 and 344 form a zoom lens. The total combination 320 will be referred to as a zoom relay. An optical trombone is one form of path length control module, others being well known in the art.

Control system 400 is required to adjust the position of mounting system 335, tilt mirror 220, and displacement control mirror 230 (and the counterpart elements in system 210') to compensate for: (1) piston errors between subapertures, (2) preserve input aperture geometry by displacing the sub-images by the correct amount, and (3) maintain proper mapping of rays from one aperture to another (i.e., rays with the same slope and height at each telescope must exit the optical system having the same slope and height with respect to the optical axis of each telescope).

Requirements for Exit Aperture Geometry

For the sake of simplicity and without loss of generality, we will consider a two element array. FIG. 2 is a representation of the two elements with the following parameters:

$d_i$ = Input aperture diameter
$d_o$ = Output aperture diameter
$S_i$ = Spacing between primary mirrors
$S_o$ = Spacing between output beams
$a_i$ = Tilt of wavefront with respect to the array
$M$ = Magnification of the telescopes The piston error in units of waves $\theta_i$ is given by:

$$\theta_i = \frac{a_i(S_i + d_i)}{\lambda}$$

The piston error for the exit aperture in units of waves is given by:

$$\theta_o = \frac{M a_i(S_o + d_o)}{\lambda}$$

As we do not want the system to introduce additional wavefront errors, we must demand that $$\Delta\theta = \theta_o - \theta_i = \frac{a_i}{\lambda}(MS_o + Md_o - S_i - d_i) = 0$$

or: $M(S_o + d_o) = (S_i + d_i)$ where $a_i \neq 0$ hence, $S_o + d_o = (S_i + d_i)/M$ This implies that the spacing between the exit pupils and the input pupils must have the same ratio as the corresponding ratio of the pupil diameters. The input pupil diameter is the diameter of the input beam as determined by the aperture of the first element. Similarly, the output or exit pupil diameter is the image of the input pupil.

The ratio can be set with a combining mirror 230 as shown in FIG. 2. Each side of the mirror can be moved in or out to control the spacing between the beams 190 and 190'. This type of spacing control can be designed for other beam geometries such as a hexagonal array with a corresponding number of mirrors. If we are to operate with only two telescopes, this combining mirror can be replaced by a combination of two mirrors that looks like a wedge. The up and down movement will control beam spacing. The apertures are fixed and the input spacing will be set by the spacing between the first optical elements, which will be set by the pointing angle. This parameter will generally be calculated from the pointing angle and fed into control unit 410.

Figure 4:
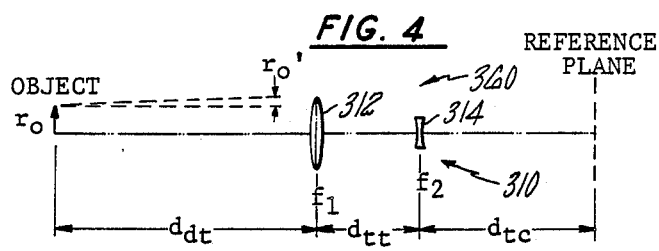
FIG. 4 illustrates the spacing of components for a simple telescope.

It is not enough to change only the spacing between exit pupils. It is also necessary that the phase fronts of radiation from the two telescopes combine properly. Assume we have a point source at a distance $d_{dt}$ from the telescope as shown in FIG. 4, which shows the telescope 310 contained in systems 210 and 210'. We must produce a system that can create a proper image of this point source.

Since the two telescopes are aligned to be the same distance away from the source, the optical axis of each telescope is the line pointing toward the source. One can show that the condition of proper matching is that, for any ray that enters one of the telescopes at a given angle $r_o'$ with respect to the local axis, there is an equivalent ray at the other telescope with the same angle and position (at the entrance of the telescope) that will map at the exit aperture in the same manner as the first ray. Hence the two have a one-to-one correlation and the two images can be brought together.

Let us examine the conditions for the exit aperture geometry and piston compensation where one of the telescopes is placed ahead of the second one as is shown in FIG. 2. If we perform a paraxial ray trace for the first telescope 310 in system 190 we get the following:

$$\begin{pmatrix} r_n \\ r'_n \end{pmatrix} =$$

$$\begin{pmatrix} 1 & d_{tc} \\ 0 & 1 \end{pmatrix} \begin{pmatrix} 1 & 0 \\ \frac{1}{f_2} & 1 \end{pmatrix} \begin{pmatrix} 1 & d_{tt} \\ 0 & 1 \end{pmatrix} \begin{pmatrix} 1 & 0 \\ \frac{-1}{f_1} & 1 \end{pmatrix} \begin{pmatrix} 1 & d_{tt} \\ 0 & 1 \end{pmatrix} \begin{pmatrix} r_0 \\ r'_0 \end{pmatrix}$$

Where: $r_o$ and $r_n$ are the height above the optical axis
$r'_o$ and $r'_n$ are the slopes of the ray
$d_{dt}$ is the distance from the source to the first lens in telescope 310
$f_1$ and $f_2$ and the focal lengths of the telescope mirror/lenses in telescope 310
$d_{tt}$ is the spacing between telescope elements in telescope 310
$d_{tc}$ is the distance between the secondary lens 314 of telescope 310 and a common reference plane.

The three matrices marked by the brace can be written as:

$$\begin{pmatrix} \frac{1}{M} & d_{tt} \\ 0 & m \end{pmatrix}$$

Where $\frac{1}{M} = 1 - \left(\frac{d_{tt}}{f_1}\right)$ $M = \frac{1}{1 - \frac{d_{tt}}{f_1}} = 1 + \frac{d_{tt}}{f_2}$ and $\frac{1}{f_2} - \frac{1}{f_1} - \frac{d_{tt}}{f_1 f_2} = 0$ (i.e.: the output beam is collimated) and we get the following equations:

$$r_{n1} = \frac{r_0}{M} + \left(d_{tt} + M d_{tc1} + \frac{d_{dt1}}{M}\right) r'_0$$

$r'_{n1} = M r'_o$ where the "1" refers to the first telescope. For the second telescope 310 in system 190' we have:
$d_{dt2} = d_{dt1} + \Delta$, where $d_{t2}$ is the distance from object to telescope 310 in system 190'.

Since we want to compensate for piston errors, we introduce a correction:
$d_{dtc2} = d_{tc1} - \Delta$, where $d_{dtc2}$ is the corrected distance from the object for telescope 2.

Substituting in to the previous equation w get:

$$r_{n2} = \frac{r_0}{M} + \left(d_{tt} + M(d_{tc1} - \Delta) + \frac{(d_{dt1} + \Delta)}{M}\right) r'_o$$

Since we are dealing with a point source $r_o = 0$ and we get:

$$r_{n1} = \left(d_{tt} + M d_{tc1} + \frac{d_{dt1}}{M}\right) r'_o$$

$$r'_{n2} = \left(d_{tt} + M d_{tc1} + \frac{d_{dt1}}{M} - \frac{\Delta(M^2 - 1)}{M}\right) r'_o$$

we see that for the two telescopes, rays with the same slope will map to different positions:

$$r_{n1} - r_{n2} = \frac{\Delta \cdot (M^2 - 1)}{M} r'_o$$

Hence, we will not be able to construct images from the two telescopes except for a very small field of view.

This error is due to the Lagrange invariant not being satisfied, since the exit angle has a value $Mr'_o$ rather the value $r'_o$, that it had before it entered the telescope. Notice that this result is what one might expect since as M approaches infinity (very large magnification) the error becomes proportional to M.

The previous equation shows we will not be able to reconstruct the image just by trying to maintain pistons. We cannot take parts of the phase front at different locations and expect to reconstruct it simply by combining the different portions without further correction. We have to think about the location of sub-images on a reference plane while maintaining zero optical path difference for the beam.

Figure 5A:
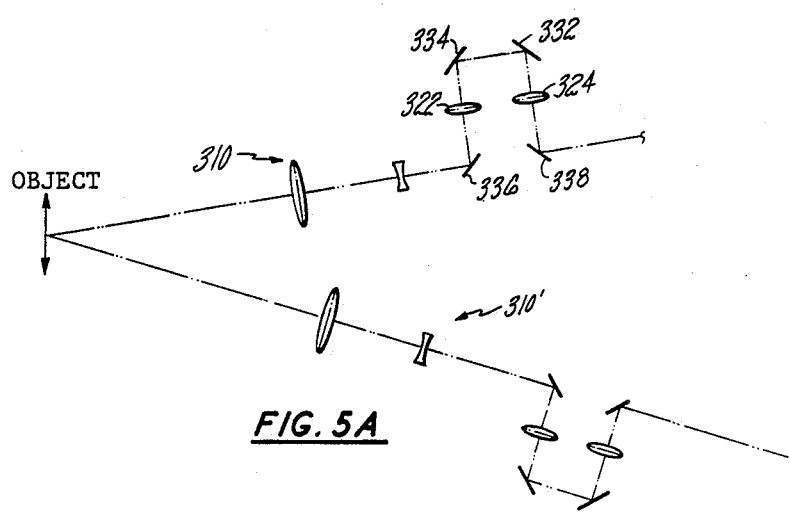
FIGS. 5A and 5B illustrate the spacing of components for a corrected telescope system.
Figure 5B:
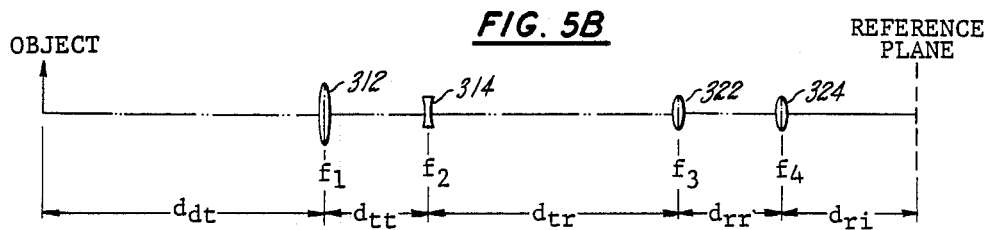

FIGS. 5A and 5B illustrate a second pair of lenses 322 and 324 that will correct the problem. As we see one of the telescopes is ahead of the other one, which is the situation when the object is off to one side of the telescope system. For this telescope we are using a single relay system as shown. The system is described by the following ray tracing matrices.

$$\begin{pmatrix} r_n \\ r'_n \end{pmatrix} = \begin{pmatrix} 1 & d_{ri} \\ 0 & 1 \end{pmatrix} \begin{pmatrix} 1 & 0 \\ \frac{-1}{f_4} & 1 \end{pmatrix} \begin{pmatrix} 1 & d_{rr} \\ 0 & 1 \end{pmatrix} \begin{pmatrix} 1 & 0 \\ \frac{-1}{f_3} & 1 \end{pmatrix} \begin{pmatrix} 1 & d_{tr} \\ 0 & 1 \end{pmatrix} \cdot$$

$$\begin{pmatrix} 1 & 0 \\ \frac{1}{f_2} & 1 \end{pmatrix} \begin{pmatrix} 1 & d_{tt} \\ 0 & 1 \end{pmatrix} \begin{pmatrix} 1 & 0 \\ \frac{-1}{f_1} & 1 \end{pmatrix} \begin{pmatrix} 1 & d_{dt} \\ 0 & 1 \end{pmatrix} \begin{pmatrix} r_o \\ r'_o \end{pmatrix}$$

where $f_3$ and $f_4$ are the focal length of the lenses 322 and 324, respectively. Since we are using $f_3$ and $f_4$ as a relay system, we will set $f_3 = f_4$ and $d_{rr} = 2f_3$.

The matrices will then be:

$$\begin{pmatrix} r_n \\ r'_n \end{pmatrix} = \begin{pmatrix} 1 & d_{r1} \\ 0 & 1 \end{pmatrix} \begin{pmatrix} -1 & d_{rr} \\ 0 & -1 \end{pmatrix} \begin{pmatrix} 1 & d_{tr} \\ 0 & 1 \end{pmatrix} \begin{pmatrix} \frac{1}{M} & d_{tt} \\ 0 & M \end{pmatrix} \begin{pmatrix} 1 & d_{dt} \\ 0 & 1 \end{pmatrix} \begin{pmatrix} r_o \\ r'_o \end{pmatrix}$$

$$= \begin{pmatrix} -1 & d_{rr} - d_{ri} - d_{tr} \\ 0 & -1 \end{pmatrix} \begin{pmatrix} \frac{1}{M} & d_{tt} \\ 0 & M \end{pmatrix} \begin{pmatrix} 1 & d_{dt} \\ 0 & 1 \end{pmatrix} \begin{pmatrix} r_o \\ r'_o \end{pmatrix}$$

$$= \begin{pmatrix} -\frac{1}{M} & M(d_{rr} - d_{ri} - d_{tr}) - d_{tt} \\ 0 & -M \end{pmatrix} \begin{pmatrix} 1 & d_{dt} \\ 0 & 1 \end{pmatrix} \begin{pmatrix} r_o \\ r'_o \end{pmatrix}$$

where M is the magnification of the telescope 310. If we design the system so that:

$M(d_{rr} - d_{ri} - d_{tr}) - d_{tt} = 0$ then we are imaging the first lens in the system (or the primary mirror in a reflective embodiment) on a reference plane at $d_{ri}$, hence we will get:

$$\begin{pmatrix} r_n \\ r'_n \end{pmatrix} = \begin{pmatrix} -\frac{1}{M} & 0 \\ 0 & M \end{pmatrix} \begin{pmatrix} 1 & d_{dt} \\ 0 & 1 \end{pmatrix} \begin{pmatrix} r_o \\ r'_n \end{pmatrix}$$

or:

-continued $$r_n = \frac{-r_o}{M} - \frac{d_{dt}}{M} \cdot \frac{r'_o}{M}$$

$$r'_n = -Mr'_o$$

Since the second telescope is in the back of the first telescope, $d_{dt2}=d_{dt1}+\Delta$, we will remove the optical path difference between the two systems length by an optical trombone or other device and correct the focus of the image at the back of the telescope as part of the relay system. The equation for the paraxial ray trace now becomes:

$$\begin{pmatrix} r_{nn} \\ r'_{nn} \end{pmatrix} = \begin{pmatrix} 1 & d_{rin} \\ 0 & 1 \end{pmatrix} \begin{pmatrix} 1 & 0 \\ \frac{-1}{f_{4n}} & 1 \end{pmatrix} \begin{pmatrix} 1 & d_{rrn} \\ 0 & 1 \end{pmatrix} \begin{pmatrix} 1 & 0 \\ \frac{-1}{f_{3n}} & 1 \end{pmatrix} \begin{pmatrix} 1 & d_{tr} - \Delta \\ 0 & 1 \end{pmatrix} \begin{pmatrix} 1 & 0 \\ \frac{1}{f_2} & 1 \end{pmatrix}$$

$$\begin{pmatrix} 1 & d_{tt} \\ 0 & 1 \end{pmatrix} \begin{pmatrix} 1 & 0 \\ \frac{-1}{f_1} & 1 \end{pmatrix} \begin{pmatrix} 1 & \Delta \\ 0 & 1 \end{pmatrix} \begin{pmatrix} 1 & d_{dt} \\ 0 & 1 \end{pmatrix} \begin{pmatrix} r_o \\ r'_o \end{pmatrix}$$

Notice that the length $\Delta$ was subtracted from this $d_{tr}$ ($d_{trn}=d_{tr}-\Delta$) to compensate for the $\Delta$ added to the distance from the object to the telescope, hence, $d_{rin}$ is the new distance from the relay system to the image plane and $d_{rrn}$ the new distance between the relay systems lenses. Again we want $f_{3n}=f_{4n}$ and we get:

$$\begin{pmatrix} r_{nn} \\ r'_{nn} \end{pmatrix} = \begin{pmatrix} 1 & d_{rin} \\ 0 & 1 \end{pmatrix} \begin{pmatrix} -1 & d_{rrn} \\ 0 & -1 \end{pmatrix} \begin{pmatrix} 1 & d_{tr} - \Delta \\ 0 & 1 \end{pmatrix} \begin{pmatrix} \frac{1}{M} & d_{tt} \\ 0 & M \end{pmatrix} \begin{pmatrix} 1 & \Delta \\ 0 & 1 \end{pmatrix} \begin{pmatrix} 1 & d_{dt} \\ 0 & 1 \end{pmatrix} \begin{pmatrix} r_o \\ r'_o \end{pmatrix}$$

Working with the first 5 matrices we get:

$$\begin{pmatrix} r_{nn} \\ r'_{nn} \end{pmatrix} = \begin{pmatrix} \frac{-1}{M} & M(d_{rrn} - d_{rin} - d_{rt} + \Delta) - d_{tt} - \frac{\Delta}{M} \\ 0 & \frac{-1}{M} \end{pmatrix} \begin{pmatrix} 1 & d_{dt} \\ 0 & 1 \end{pmatrix} \begin{pmatrix} r_o \\ r'_o \end{pmatrix}$$

Now if we select $d_{rin}$ and $d_{rrn}$ such that:

$$M(d_{rrn} - d_{rin} - d_{rt} + \Delta) - d_{tt} - \frac{\Delta}{M} = 0$$

and $$d_{rrn} + d_{rin} = d_{rr} + d_{ri}$$

then we have our piston compensation and at the same time we preserve the phase front.

Solving for $d_{rrn}$ and $d_{rin}$ in terms of the rest of the given parameters yields:

$$d_{rrn} = \frac{d_{rr}}{2} + \frac{d_{ri}}{2} + \frac{d_{rt}}{2} - \frac{\Delta}{2} - \frac{d_{tt}}{2M} + \frac{\Delta}{2M^2}$$

$$d_{rin} = \frac{d_{rr}}{2} + \frac{d_{ri}}{2} - \frac{d_{rt}}{2} + \frac{\Delta}{2} - \frac{d_{tt}}{2} - \frac{\Delta}{2M^2}$$

Now the transfer matrix takes the form:

$$\begin{pmatrix} r_{nn} \\ r'_{nn} \end{pmatrix} = \begin{pmatrix} \frac{-1}{M} & 0 \\ 0 & -M \end{pmatrix} \begin{pmatrix} 1 & d_{dt} \\ 0 & 1 \end{pmatrix} \begin{pmatrix} r_o \\ r'_o \end{pmatrix}$$

which is exactly as the equation we had before for the first telescope. Hence we have maintained the piston and phase front for the two beams. This is true for all slopes and hence it will be true for an extended object. We could have done the same by adding the piston error in the equation for the first telescope and reached a similar result.

We have now two beams that have the same phase front and the same O.P.D. However, the two beams are rotated 180° with respect to each other. We will add a second relay system (340 in FIG. 2) for beam inversion that simply inverts each beam without further changing it.

We have taken parts of the wavefront and manipulated them. These parts of the wavefront must have a proper relation with each other. Since the telescopes are pointed to a common point there is a differential tilt between the telescopes. If the two output beams are simply made collinear we are adding an angular pointing error into the beams. The beams must be put together such that the tilt angle between them is equal to the tilt between the two telescopes times the telescope magnification. Once we do this the beams look as if they come through a common telescope and now we can send the sub-beams through a common lens system and create the image of the object we are aiming at. Tilt mirrors 220 and 220', acting under control of tilt controller 430 described above, permit the adjustment of tilt as required.

The previous embodiment used lenses and a zoom relay, together with an inverting relay. The functions performed by this apparatus are the transformation or relaying of the several sub-beams of a phased-array telescope with simultaneous correction of the sub-beam displacement and tilt, as well as the correction of the optical path differences. The method used was the correction of the path length and the imaging of the first optical element of the system (lens or mirror) on a common reference plane (which may be the system image plane or one chosen for convenience), together with the displacement and tilt corrections. These functions may be carried out by more than one apparatus and many other embodiments of the invention will be apparent to those skilled it the art in the light of this disclosure.

Figure 6:
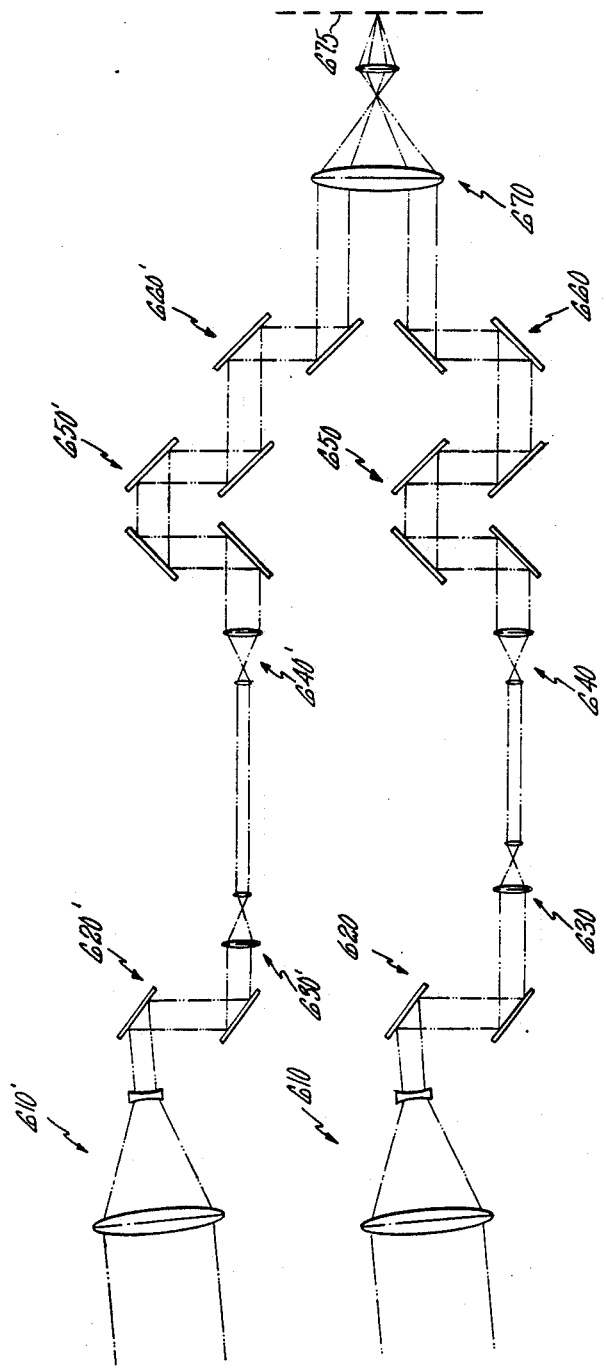
FIGS. 6 and 7 illustrate alternative embodiments of the system.

Referring now to FIG. 6, there is shown an alternative embodiment that has the advantage that only translations of optical units are involved, instead of a modification within a unit, such as adjusting the focal length of a zoom lens. The lower telescope, denoted by unprimed numbers, consists of a first sub-telescope 610 having magnification $M_t$, a pair of displacement mirrors 620, which may also perform steering functions, a first movable relay 630, which may slide along the axis of the telescope, a second fixed relay 640 for inverting the output of relay 630, an optical trombone 650 for performing the path length correction, a displacement and tilt module 650 for delivering the beam with the correct displacement and tilt with respect to the other telescope outputs, and a final image-forming module 670, for imaging the combined telescope outputs on the final image plane 675. An advantageous feature of the embodiment of FIG. 6 is that the adjustments are not within a telescope, but are simple translations. In operation, if the unprimed telescope is ahead of the other by an amount $\Delta$, then trombone 650 is adjusted by $\Delta$ to make the optical paths equal and the image correction is effected by sliding relay 630 along the axis toward relay 640 by an amount $\Delta \ (M_r^2-1)/M_t^2(M_r^2-1)$, where $M_t$ and $M_r$ are the magnifications of relays 610 and 630, respectively. Equivalently, relay 640 could be moved forward or a trombone could be placed between relays 630 and 640 to produce an effective shift.

Figure 7:
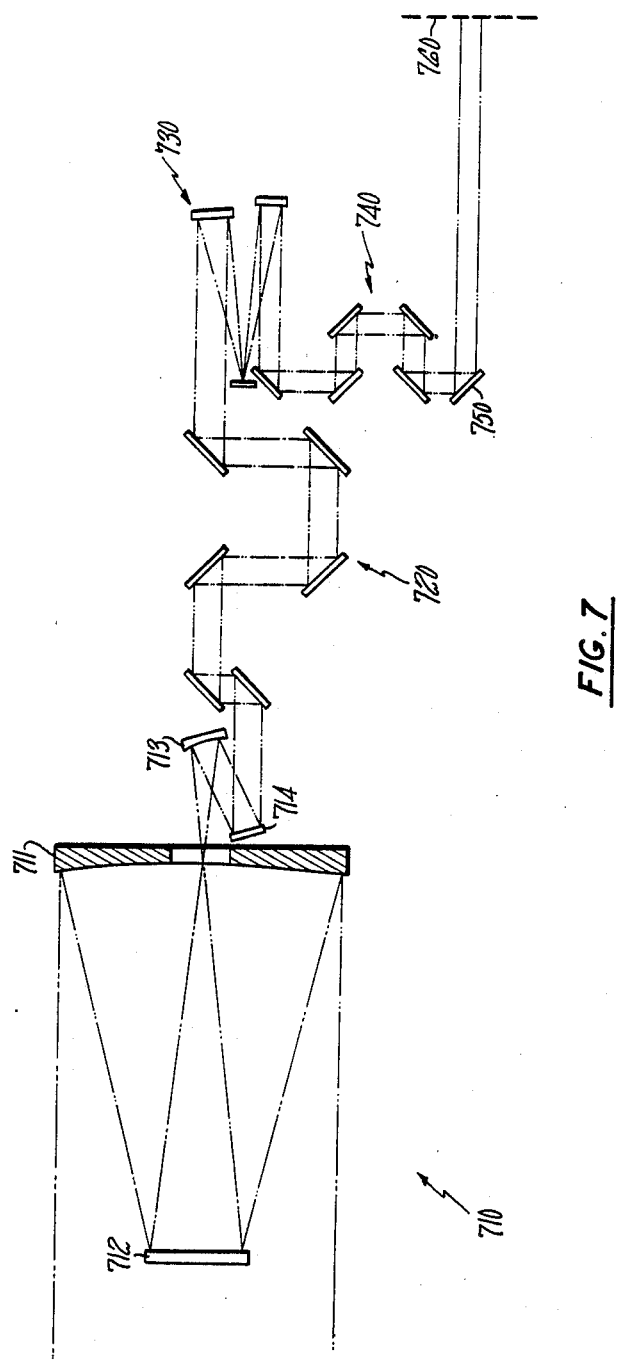

Another embodiment is illustrated in FIG. 7, in which only reflective elements are used and the movement is that of two trombones, with the relay remaining fixed. Telescope 710 comprises curved mirrors 711 and 713, with flat mirrors 712 and 714. The last mirror is an optional steering mirror. Trombones 720 and 740 bracket relay telescope 730. A final tilt mirror 750 directs the beam through reference plane 760 with the correct relative displacement and tilt. If one telescope is ahead of another by an amount $\Delta$, trombone 720 shortens the path length by $\Delta_1 = \Delta(M_r^2 M_r^2 - 1)/M_t^2(M_r^2-1)$. Trombone 740 then lengthens the path by $$\Delta_2 = \frac{\Delta(M_t^2 - 1)}{M_t^2(M_r^2 - 1)}$$

The total path length of the second telescope is adjusted by $\Delta$, of course, with the different lengths $\Delta_1$ and $\Delta_2$ serving to adjust the telescope image location so it lies on the common reference plane.

In particular, the magnification of the several relays may be varied and the location of the path length control trombone or other device and the means for shifting the effective position off a relay (such as a trombone or a translation stage upon which the relay is mounted and referred to as a relay shift means) may be placed in different order. For example in FIG. 6, the path length control means 650 is placed after the relays, but it could have been placed elsewhere with appropriate adjustment of the relay positions and magnifications to preserve Lagrange invariance according to the principles of the invention.

Those skilled in the art will readily be able to devise many variations of the invention, with different combinations of mirrors, lenses, adjustable magnifications, and adjustable trombone positions.

We claim:

1. An optical telescope system for combining a plurality of telescope sub-images formed from a plurality of sub-beams from a plurality of optical telescopes to form a composite image of an object and comprising a plurality of telescopes, each having an object path length from an object to a first optical element and a telescope path length along a telescope axis from said first optical element to a common reference plane and an input aperture and an exit aperture of a sub-beam; in which system each optical telescope includes telescope path length control means to adjust said telescope path lengths of said plurality of optical telescopes such that each optical telescope delivers a telescope image to said reference plane in phase; and image combining means for combining said plurality of telescope images from said plurality of optical telescopes on a common image surface to form said composite image, characterized in that at least one telescope further includes:

image relay means for relaying an image of said first optical element of said telescope to said common reference plane, said image relay means including at least one optical relay and at least one path length control module;

beam displacement means for controlling a relative reference-plane transverse displacement from said telescope axis at said common reference plane of first and second sub-beams to have the same ratio to a corresponding relative input transverse displacement at said first optical elements of said telescopes of said first and second sub-beams as the ratio of corresponding diameters of said exit and input apertures of said first and second sub-beams, and;

beam tilt means for directing said sub-beams on said common reference plane with a predetermined image tilt angle, said optical relay, control module and beam tilt means being disposed and adjusted to preserve Lagrange invariance between each of said telescope sub-images, whereby said sub-images combine to form said composite image.

2. An optical telescope system according to claim 1, further characterized in that at least one of said plurality of optical telescopes further comprises:

a first sub-telescope having magnification $M_t$, a first optical relay having a magnification $M_r$, and being displaced along said telescope axis from said first sub-telescope by a first predetermined distance, a second optical relay displaced along said telescope axis from said first optical relay by a second predetermined distance, and relay shift means for altering at least one of said first and second predetermined distances by a relay shift amount $D_r$, related to a correction length $D_c$ of said path length control means and in the opposite sense.

3. An optical system according to claim 2, further characterized in that said relay shift mean sis disposed between said second optical relay and said common image surface and said relay shift amount is substantially equal to the quantity $D_c^{19}(M_r^2-1)/M_r^2(M_r^2-1)$.

4. An optical system according to claim 1, further characterized in that at least one of said plurality of optical telescopes further comprises:

a first sub-telescope having magnification $M_t$, a first optical relay having a magnification $M_r$, and being displaced along said telescope axis from said sub-telescope by a first predetermined distance, a second optical relay displaced along said telescope axis from said first optical relay by a second predetermined distance, and relay shift means for altering at least one of said first and second predetermined distances by a relay shift amount $D_r$, related to a correction length $D_c$ of said path length control means in that the sum of $D_c$ and $D_r$ equals $D_{total}$, a total path length correction of said at least one telescope.

5. An optical system according to claim 4, further characterized in that said path length control means and said relay shift means bracket said first optical relay, and said path length control means adjusts said path length by an amount $D_c = D_{total} \cdot (M_t^2 M_r^2 - 1)/M_t^2(M_r^2 - 1)$ and said relay shift means adjusts said path length by an amount $D_r = D_{total}(M_t^2 - 1)/M_t^2(M_r^2 - 1)$.

* * * * *

UNITED STATES PATENT AND TRADEMARK OFFICE
CERTIFICATE OF CORRECTION

PATENT NO. : 4,953,964

DATED : September 4, 1990

INVENTOR(S) : David Anafi and Philip A. Slaymaker

It is certified that error appears in the above-identified patent and that said Letters Patent is hereby corrected as shown below:

Claim 3, Column 10, line 65: after "the quantity" delete "$D_c^{19}(M_t^2-1)/M_t^2(M_r^2-1)$" and insert --$D_c \cdot (M_t^2-1)/M_t^2(M_r^2-1)$--

Signed and Sealed this

Twelfth Day of May, 1992

Attest:

DOUGLAS B. COMER

Attesting Officer

Acting Commissioner of Patents and Trademarks